(12) United States Patent
Bruck et al.

(10) Patent No.: US 7,680,147 B2
(45) Date of Patent: Mar. 16, 2010

(54) DATA TRANSMISSION SYSTEM AND METHOD

(75) Inventors: Jehoshua Bruck, La Canada, CA (US);
Michael Langberg, Pasadena, CA (US);
Alexander Sprintson, College Station, TX (US)

(73) Assignee: California Institute of Technology, Pasadena, CA (US)

( * ) Notice: Subject to any disclaimer, the term of this patent is extended or adjusted under 35 U.S.C. 154(b) by 1165 days.

(21) Appl. No.: 11/218,334

(22) Filed: Aug. 31, 2005

(65) Prior Publication Data

US 2006/0198352 A1 Sep. 7, 2006

Related U.S. Application Data

(60) Provisional application No. 60/621,000, filed on Oct. 21, 2004.

(51) Int. Cl.
*H04J 3/00* (2006.01)
(52) U.S. Cl. .................................................. 370/465
(58) Field of Classification Search .................. 370/465, 370/470, 471
See application file for complete search history.

(56) References Cited

U.S. PATENT DOCUMENTS

| | | | | |
|---|---|---|---|---|
| 4,774,707 A | * | 9/1988 | Raychaudhuri | ............. 370/447 |
| 2005/0147075 A1 | * | 7/2005 | Terry | ......................... 370/338 |
| 2005/0193309 A1 | * | 9/2005 | Grilli et al. | ................. 714/752 |

OTHER PUBLICATIONS

U.S. Appl. No. 60/621,000, filed Oct. 21, 2004, Bruck et al.
Acharya, S., et al., "Broadcast Disks: Data Management for Asymetric Communication Environments," Proceedings of ACM SIGMOD, pp. 199-210, (May 1995).
Ammar, M.H., et al., "The Design of Teletext Broadcast Cycles," Performance Evaluation, 5(4): 235-242 (1985).
Ammar, M.H., et al., "Response Time in a Teletext System: An Individual User's Perspective," IEEE Trans. Comm., Com-35(11):1159-1170 (1987).
Bar-Noy, A., et al., "Pushing Dependent Data in Clients-Providers-Servers Systems," Wireless Networks, 9(5):421-430 (2003).
Borodin, A., et al., Online Computation and Competitive Analysis, Chapter 7, Cambridge University Press (1998).
Brakerski, Z., et al., "General Perfectly Periodic Scheduling," Proceedings of PODC '02, pp. 163-172 (Jun. 2002).
Cheriton, D., et al., "Dissemination-Oriented Communication Systems," Technical Report, Stanford University (1992).
Foltz, K., et al., "Scheduling for Efficient Data Broadcast over Two Channels," Proceedings of International Symposium on Information Theory (ISIT), p. 113 (Jun. 2004).
Hameed, S., et al., "Log-time Algorithms for Scheduling Single and Multiple Channel Data Broadcast," Proceeding of MODICOM '97 (1997).

(Continued)

*Primary Examiner*—Melvin Marcelo
(74) *Attorney, Agent, or Firm*—Ladas & Parry LLP

(57) ABSTRACT

A method of transmitting data packets, where randomness is added to the schedule. Universal broadcast schedules using encoding and randomization techniques are also discussed, together with optimal randomized schedules and an approximation algorithm for finding near-optimal schedules.

14 Claims, 2 Drawing Sheets

OTHER PUBLICATIONS

Imielinski, T., et al., "Data on Air: Organization and Access," IEEE Transactions on Knowledge and Data Engineering, 9(3): 353-372 (1997).

Langberg, M., et al., "Optimal Universal Schedules for Discreet Broadcast," California Technical Institute of Technology, ETR 057, Apr. 12, 2004 [retrieved on Aug. 29, 2005] retrieved from the internet <URL: http://www.paradise.caltech.edu/ETR.html>.

Landberg, M., et al., "Optimal Schedules for Asynchronous Transmission of Discrete Packets," California Institute of Technology, ETR 062, Oct. 12, 2004 [retrieved on Aug. 29, 2005].Retrieved from the internet:<URL:http://www.paradise.caltech.edu/ETR.htnl>.

Vaidya, N.H., et al., "Data Broadcast in Asymmetric Wireless Environments," Proceedings of First International Workshop on Satellite-based Information Services (WOSBIS) 1996.

* cited by examiner

DATA TRANSMISSION SYSTEM AND METHOD

CROSS REFERENCE TO RELATED APPLICATIONS

This application claims the benefit of U.S. provisional Patent Application Ser. No. 60/621,000, filed Oct. 21, 2004 for "Optimal Schedules for Asynchronous Transmission of Discrete Packets" by Jehoshua Bruck, Michael Langberg and Alexander Sprintson, the disclosure of which is incorporated herein by reference in its entirety.

STATEMENT OF FEDERAL INTEREST

The invention described herein was made in the performance of work under a NASA contract, and is subject to the provisions of Public Law 96-517 (35 USC 202) in which the Contractor has elected to retain title.

FIELD

The present disclosure relates to data transmission and, in particular, to schedules for asynchronous transmission of discrete packets.

BACKGROUND

Modern society has become heavily dependent on wireless networks in order to deliver information to diverse clients. People expect to be able to access dynamic data, such as stock quotes and traffic conditions, at any time, whether they are at home, in an office, or traveling. Wireless data distribution systems also have a broad range of applications in military networks, such as transmitting up-to-date battle information to tactical commanders in the field. New applications place high demands on the quality, availability, and timeliness of data distribution.

Distribution of dynamic information is a complex task and poses several major challenges. First, the underlying systems must be scalable, i.e., be able to serve a large number of clients in an efficient way. Second, the systems need to deal with heterogeneous clients that have different objectives, computational capabilities and access patterns. Next, each client must be able to receive the up-to-date information upon request with small delay and small expense of battery power. Finally, the data distribution systems must rely on the wireless infrastructure which is inherently asymmetric. In a typical wireless system, the downlink channel has higher bandwidth and capacity than the uplink channel. In addition, the downlink channel is operated by a powerful antenna, while the uplink channel is driven by a mobile device with limited power resources.

The intrinsic asymmetry of wireless infrastructure impacts the way information is delivered to clients. Recently, wireless data broadcast (see references [10,7,1]) has emerged as an attractive way to disseminate data to a large number of clients. In data broadcast systems, the server proactively transmits the information on the downlink channel and clients access data by listening to the channel. This approach enables the system to serve a large number of heterogeneous clients, minimizing power consumption and keeping the clients' locations secret.

FIG. 1 depicts a typical data broadcast system. The system includes the following components: the database, the server (scheduler), the broadcast channel, and the wireless clients. The server periodically accesses the database, retrieves the most recent data, encapsulates it into packets and sends the packets (or encoding thereof) over the broadcast channel. Upon a request for new information, the wireless clients listen to the channel and wait for the next transmitted packet.

The transmission schedule is a key element of wireless data broadcast systems. The transmission schedule is a time sequence that specifies the "best" data to transmit over the channel at any point in time. The goal in the design of transmission schedules is to minimize both the waiting time of the client and the staleness of the information. Waiting time is the amount of time spent by a client waiting for data, while the staleness captures the amount of time that passes from the moment the information is generated until it is delivered to the client. Low waiting time and staleness are necessary for providing Quality-of-Service guarantees to the end user. In addition, the waiting time is closely related to the amount of power spent by the client in order to obtain the information.

For example, consider the schedule depicted on FIG. 2. In this schedule, the server periodically transmits packets one after another, without encoding. In order to satisfy the request, a client has to listen to at least one packet from the beginning to the end. Indeed, since each packet describes the state of the information source at different points at time, the content of each packet is different. Therefore, even though the client may listen to (part of) previous packet (number i), it still needs to wait until the completion of packet i+1 in order to get the necessary update. This implies that the worst case waiting time of this schedule is equal to the length of the longest packet in the schedule. It can be shown that any deterministic schedule has a poor worst-case performance.

The design of optimum schedules for data broadcast has attracted a large body of research (see e.g., references [3,2,9,11,8,4,6] and references therein). The prior works in this area assume that clients' requests are distributed uniformly over time and focus on minimizing the average waiting time. However, in many settings of practical interest, it is more important to minimize the worst case waiting time, i.e., the maximum waiting time experienced by a client, independently of his access pattern. This requirement is typically mandated by the service-level agreements (SLAs) that guarantee a certain bound on the time required to obtain information. For example, there might be more requests at the top of the hour, as many clients want to update their internal databases. Alternatively, the distribution of client requests may depend on various global events over which the server has no control. In addition, due to inherent inaccuracy of internal clocks and lack of synchronization, some clients may experience very long waiting times.

Accordingly, what is needed in the art are systems and methods that guarantee low worst-case waiting time, independently of the client behavior. Such methods should not require synchronization between the clients and server and enable to serve diverse clients with different access patterns.

SUMMARY

According to a first aspect, a data transmission system is disclosed, comprising: a database; a server, connected with the database, to schedule information to be transmitted; a broadcast channel; and a plurality of clients to receive said information transmitted from the server through the broadcast channel, wherein said information is transmitted to the clients over time intervals of random length.

According to a second aspect, a method of transmitting data over a channel is disclosed, comprising: sending the data as packets; and allocating a time interval length to each packet, wherein the packets are encoded, the encoded packets having an encoding length matching said time interval length.

According to a third aspect, a method for generating a transmission schedule of data packets over a broadcast channel is disclosed, comprising: providing a staleness constraint; providing an approximation parameter; and computing a transmission schedule of encoded data packets at randomly selected time interval lengths based on said staleness constraint and said approximation parameter.

According to a fourth aspect, a method of transmitting data over a channel is disclosed, comprising: sending the data as packets; and allocating a time interval length to each packet, wherein each time interval comprises a first portion during which no data is transmitted and a second portion containing the packet.

According to a fifth aspect, a system for constructing a broadcast schedule is disclosed, comprising: a plurality of packets to be transmitted periodically over time intervals to incorporate requests arriving at different times; a random bit generator; and a packet encoder to encode the packets to be transmitted, wherein said time intervals are random time intervals based on said random bit generator.

Reference can also be made to M. Langberg, A. Sprintson, J. Bruck, *Optimal Universal Schedules for Discrete Broadcast*, Proceedings of ISIT '04, Chicago, Ill., Jun. 27-Jul. 4, 2004 and to the technical report M. Langberg, A. Sprintson, J. Bruck, *Optimal Universal Schedules for Discrete Broadcast*, California Institute of Technology, ETR 057, Apr. 12, 2004 [retrieved on 2005-08-29]. Retrieved from the Internet: <URL: http://www.paradise.caltech.edu/ETR.html>, both of which are incorporated herein by reference in their entirety.

Reference can further be made to M. Langberg, A. Sprintson, J. Bruck, *Optimal Schedules for Asynchronous Transmission of Discrete Packets*, California Institute of Technology, ETR 062, Oct. 12, 2004 [retrieved on 2005-08-29]. Retrieved from the Internet: <URL: http://www.paradise.caltech.edu/ETR.html>, incorporated herein by reference in its entirety.

DETAILED DESCRIPTION

Figure 1:
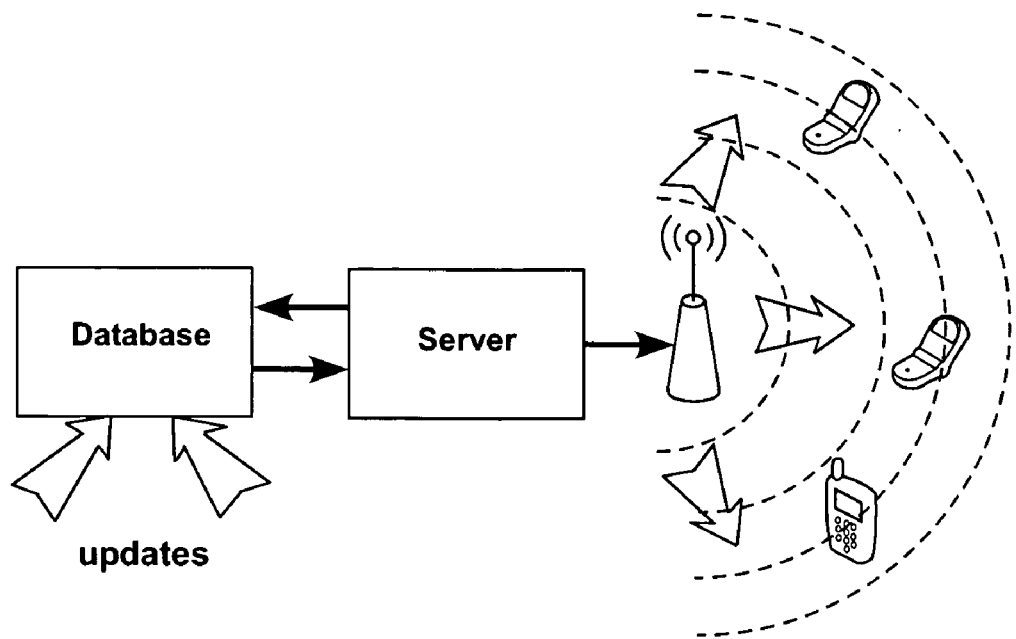
FIG. 1 is a schematic representation of a data broadcasting system.

In this paragraph, it will be shown that any deterministic schedule has poor worst-case performance. In particular, the worst-case waiting time of such schedule is equal to the length of the longest packet. Indeed, suppose that i is the longest packet in the schedule and denote by $x_i$ the length of packet i and by $[t_i, t_{i+1}]$ the transmission interval of this packet. Then, if the information request arrives immediately after time $t_{i+1} - x_i$, the waiting time will be close to $x_i$ time units.

In order to improve the worst-case performance of wireless clients, the notion of random schedules is introduced. In a random schedule each packet is transmitted, in an encoded form, over a time interval whose length is a random variable, distributed according to a certain probability distribution. A random schedule can be viewed as a probability distribution over a set of deterministic schedules with unequal transmission intervals. With random schedules, a waiting time at any time t is a random variable. Thus, the design goal is to minimize the expected worst-case waiting time of the schedule, where the expectation is taken over the probability distribution of the server.

In order to implement random schedules a random bit generator can be used. The random bit generator outputs a stream of random bits. This stream is then converted to a sequence of random numbers, which are distributed according to a given probability distribution function. These numbers are then used to determine the length of the intervals during which packets are being transmitted.

In order to evaluate the worst-case performance of a schedule, the notion of an adversarial client or an adversary is employed. The goal of such a client is to maximize waiting time by generating requests at times which are the least desirable for the schedule. The adversary knows the probability distribution of the schedule and can place its request based on the observed history. The adversary captures the situations in which clients base their requests on information previously broadcasted over the channel. For example, consider the schedule depicted in FIG. 2. In this schedule the length of each interval is exactly one time unit. Suppose that a client has to receive a stock market update every 10 time units. Thus, after listening to an update at time t, it expects the next update at time t+10. However, due to clock skew, the client begins to listen to a channel at time t+10+$\epsilon$, where $\epsilon$ is a small value. In this case, the expected waiting time of the client is close to one time unit.

For clarity, the rest of the application focuses on settings in which the broadcast channel is dedicated to a single information source. In such settings, each packet carries the same information, e.g., stock quotes. The content of each packet, however, is different, because each packet captures the most recent state of the information source. It is also assumed that all packets have an identical size and that the transmission of a packet (without encoding) requires one time unit.

In accordance with the present disclosure, there are two ways to transmit data: (1) with encoding: each interval contains an encoding of a packet, such that the length of the encoded packet is equal to the length of the interval. (2) no encoding: each interval contains a portion during which no data is being transmitted followed by a portion during which the original data of unit length (without additional encoding) is transmitted. (1) is discussed in the section "Encoded Transmission" of the present application, while (2) is discussed in the section "Broadband Schedules With No Encoding" of the present application.

1. Encoded Transmission

A broadcast schedule specifies the times at which the packets are generated and transmitted. Each packet is allocated a time interval whose length is at least one time unit. Each packet is periodically broadcasted (in correct bit order) over a corresponding time interval. Such encoding allows the client to restore the original packet from any portion of the interval whose length is at least one time unit.

Definition 1 [Schedule S] A schedule is a sequence $\{X_1, X_2, \ldots\}$, $X_i \geq 0$, such that $X_i + 1$ specifies the length of the time interval allocated for packet i.

A schedule $S=\{X_1, X_2, \ldots\}$ can also be defined by its transmission sequence $\{T_1, T_2, \ldots\}$, where $T_n$ represents the beginning of the $n^{th}$ interval, that is, $T_1=0$ and $T_n=\Sigma_{i=1}^{n-1}X_i+n-1$ for all $n>1$.

Example 1

Figure 2:
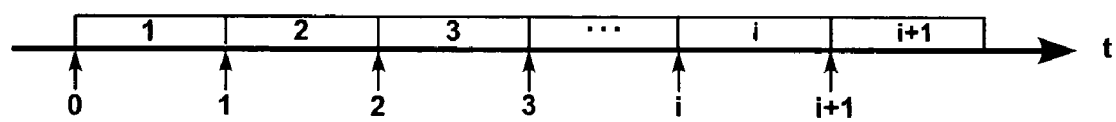
FIG. 2 shows a schedule in which the length of each packet is one time unit.
Figure 3:
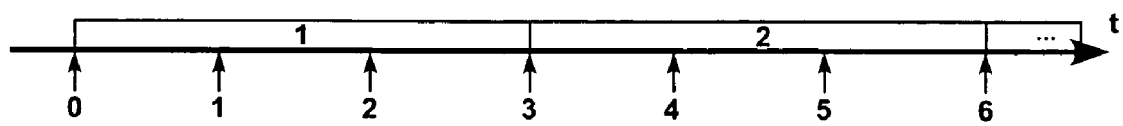
FIG. 3 shows a schedule in which each packet is transmitted in an encoded form over a time interval of length three time units.

FIG. 2 depicts schedule $S_1=\{0, 0, 0, \ldots\}$. In this schedule packet i is transmitted over the interval [i,i+1], for i=0, 1, .... FIG. 3 depicts a schedule $S_2=\{2, 2, 2, \ldots\}$. While in the first schedule each packet is sent without encoding, in the second schedule each packet is periodically broadcasted over an interval of length 3.

1.1 Waiting Time

Efficient data broadcast systems require schedules that minimize waiting time, i.e., the amount of time spent by the client waiting for data. Let S be a schedule, and suppose that a client request is placed at time t. Also, let n be the current interval, i.e., the interval for which $T_n \leq t < T_{n+1}$. The waiting time depends on the time left in the current interval, i.e., $T_{n+1}-t$. Specifically, if $T_{n+1}-t \geq 1$ then the client request can be satisfied within the current interval, hence the waiting time is zero. Otherwise, the client must wait until the beginning of the next interval, hence its waiting time is $T_{n+1}-t$.

Definition 2. [Waiting Time, WT(S,t)] The Waiting Time WT(S,t) for a request at time t using a schedule $S=\{X_1, X_2, \ldots\}$ is defined as follows:

$$WT(S, t) = \begin{cases} T_{n+1} - t & \text{if } T_{n+1} - t < 1 \\ 0 & \text{otherwise} \end{cases}$$

where n is the current interval, i.e., the interval for which it holds that $T_n \leq t < T_{n+1}$.

For example, in schedule $S_1$, the waiting time of the request that arrives at time t is $\lceil F \rceil - t$. In contrast, in schedule $S_2$, the waiting time is zero for many requests. Indeed, suppose that the client arrives at time t, $3 \leq t \leq 6$. If the remainder of the current interval is more than one unit, i.e., $6-t \geq 1$, then the waiting time of the client is zero. Otherwise, the client must wait 6-t time units for the beginning of the next interval.

1.2 Staleness

The staleness captures the age of the information delivered to the client. The staleness depends on both the amount of time that has passed from the beginning of the current interval n, i.e., $t-T_n$, and the amount of time left in the current interval, i.e., $T_{n+1}-t$. Specifically, if $T_{n+1}-t \geq 1$ then the client request can be satisfied within the current interval. In this case the client receives the data $t-T_n$ time units after it was obtained from the database, hence the staleness is $t-T_n$. If $T_{n+1}-t<1$, then the client must wait to the beginning of the next interval, and the information it receives will be up-to-date, i.e., the staleness will be zero.

Definition 3 [Staleness, ST(S,t)] The Staleness ST(S,t) for a request at time t using a schedule $S=\{X_1, X_2, \ldots\}$ is defined as follows.

$$ST(S, t) = \begin{cases} 0 & \text{if } T_{n+1} - t < 1 \\ t - T_n & \text{otherwise} \end{cases}$$

where n is the current interval, i.e., the interval for which it holds that $T_n \leq t < T_{n+1}$.

Note that in the schedule $S_1$ the staleness is zero for any request. In contrast, in schedule $S_2$, the staleness is positive for some requests. For example, suppose that the client arrives at time t, $3 \leq t \leq 6$. If the remainder of the current interval is more than one unit, i.e., $6-t \geq 1$, then the client request is satisfied within the current interval and the staleness is t-3. Otherwise, the client must wait for the beginning of the next interval, hence the staleness is zero.

Staleness and waiting time have certain duality properties. Namely, for any specific value of t it is the case that exactly one of the two is not zero. In general, as shown below, a lower waiting time can be achieved at the cost of higher staleness.

1.3 Universal Schedules

The goal of universal schedules is to minimize waiting time for any client, regardless of its behavior. For that end, it is assumed that the requests are generated by an adversary, whose purpose is to generate requests resulting in high waiting time. Both schedules $S_1$ and $S_2$ have a poor performance in the presence of an adversary. For example, suppose that an adversary puts its request at time $t=T_i-1+\Delta$, for some small value of $\Delta>0$, where $T_i$ is the beginning of some interval i. In this case, the waiting time is $1-\Delta$, which can be arbitrarily close to one time unit.

Now, it is shown that the worst-case waiting time of any deterministic schedule is close to one time unit (The only exception is schedule in which one packet is broadcasted over an infinite interval. This schedule, however, has unbounded staleness and hence cannot be used for practical purposes). Since the adversary knows the schedule, it can generate a request $1-\Delta$ units of time before the transmission of the next item. In order to deal with such a powerful adversary and to improve the worst-case behavior of the system the applicants propose to add randomness to the schedule. In the proposed schedules according to the present embodiment, each packet is transmitted, preferably in an encoded form, over an interval of random length.

As mentioned above, there are two ways the randomness can be incorporated into the schedule. In the first approach, detailed in this section, a certain level of redundancy is added to the schedule. In this approach every packet is transmitted over a larger time interval in an encoded form. This time interval is larger than the time required to transmit the original packet. Encoding ensures that client is able to satisfy its request by listening to a sufficiently large portion of the interval. One possible form of encoding is to transmit the packet periodically over the interval in the correct bit order, but other forms can also be considered. Those forms are assumed to be known to the person skilled in the art and will not be discussed here in detail. In the second approach, detailed in Section 2, an empty interval of random length is inserted into the schedule before the transmission of each packet.

In the proposed random schedules the lengths $X_i$ of all intervals are random variables. This implies, in turn, that the values of waiting time WT(S,t) and staleness ST(S,t) for any request time t are also random variables.

1.4 Expected Staleness and Waiting Time

In randomized settings, there are several types of adversaries that can be considered (see reference [5], Chapter 7.1). One type is an oblivious adversary, i.e., an adversary that decides about its requests in advance, before the broadcast begins. This adversary is relatively weak and can be dealt with by transmitting an empty interval of random length followed by a deterministic schedule. In what follows, the adversary is assumed to be adaptive, i.e., a request generated at time t is based on the history of the schedule from the beginning of the transmission up to time t. Such an adversary models the worst possible access pattern, including possible correlations between requests and prior transmissions.

In order to define the expected staleness and waiting time for adaptive adversaries the probability distribution of a given random schedule S is conditioned on the history of S up to time t. Intuitively, the history of a schedule can be described by the lengths of the intervals transmitted up to time t.

Definition 4 A history $H=(t, x_1, x_2, \ldots, x_l)$ of a random schedule $S=\{X_1, X_2, \ldots\}$ at time t is the event in which (a) For all i, $1 \leq i \leq l$, it holds that $X_i = x_i$; and (b)

$$\sum_{i=1}^{l} x_i + 1 \leq t < \sum_{i=1}^{l+1} x_i + l + 1.$$

In other words, $H=(t, x_1, x_2, \ldots, x_l)$ is the event in which (a) For the first l random variables in S it holds that $X_i = x_i$, and (b) The number of intervals that are completely broadcasted up to time t is l.

Formally, let H be a history event. H is said to be admissible if it occurs with a non-zero probability. For admissible histories H, let S|H be the schedule obtained by conditioning S on the event H. Notice that S|H is also a random schedule. The worst-case expected waiting time of a schedule is defined as follows:

$$EWT(S) = \sup_{H,t} E[WT(S|H, t)]$$

Similarly, the worst-case expected staleness is defined by:

$$EST(S) = \sup_{H,t} E[ST(S|H, t)]$$

EWT(S) and EST(S) capture the worst-case expected waiting time and staleness of a schedule up to time t. The expectation is taking over the schedule distribution S|H, and the maximization is over admissible history events H.

Example 2

Consider the schedule in which the length of each interval is uniformly distributed on [1,2]. It can be easily verified that the worst-case expected waiting time of this schedule is 0.5, which is a significant (50%) improvement over deterministic schedules. A simple calculation shows that the worst-case expected staleness of this schedule is just 0.25. As detailed below, a lower waiting time can be achieved under the same staleness constraint.

1.5 I.i.d. Schedules

In what follows schedules $S=\{X_1, X_2, \ldots\}$ in which all random variables $X_i$ are independent and identically distributed (i.i.d.) are considered. Such schedules are referred to as i.i.d. schedules. It can be shown that for any schedule S there exists an i.i.d. schedule S' which is at least as good as S, i.e., $EWT(S') \leq EWT(S)$ and $EST(S') \leq EST(S)$.

The objective in the design of data broadcast schedules can be summarized as follows: Given a staleness constraint s, find a schedule S whose worst-case expected waiting time EWT(S) is minimal subject to the staleness constraint $EST(S) \leq s$. In what follows OPT(s) denotes the minimum worst-case expected waiting time of a schedule that satisfies staleness constraint s.

1.6 Optimal Solution for Small Values of Staleness

In the next theorem optimal universal schedules for small values of the staleness constraint s, i.e., $s \leq 0.13$ are presented.

The proof of the following theorem is omitted, for the sake of clarity. Theorem 1 Let $s \leq 0.13$ be a staleness constraint. Then, the optimal schedule that satisfies s has distribution function $F(x)=\min\{1, C(s)e^x\}$ and yields worst-case expected waiting time C(s), where $$C(s) = \left(1 - \frac{2s}{s + \sqrt{s(4+s)}}\right) e^{-\frac{1}{2}(s+\sqrt{s(4+s)})}$$

1.7 Approximation Algorithm

In the next paragraphs, an approximation algorithm that computes optimal broadcast schedules will be detailed. The algorithm receives as input a staleness constraint s and any (arbitrarily small) approximation parameter $\epsilon$, and returns a schedule S whose worst-case expected staleness is at most s and whose worst-case expected waiting time is at most $OPT(s)+\epsilon$. The computational complexity of the algorithm is polynomial in $s/(\epsilon)$.

The approximation algorithm has two steps. First, it is shown that for any $\epsilon_1 > 0$ there exists a schedule $S_1$ such that $EST(S_1) \leq s$, $EWT(S_1) \leq OPT(s)+\epsilon_1$ and the support of $S_1$ (The support of a Cumulative Distribution Function F(x) is a set of values of x at which the function is strictly less than 1, i.e., $\{x|F(x)<1\}$) is bounded by $s/(\epsilon_1)$. In other words, the optimal distribution can be approximated by a distribution with bounded support. Second, it is shown that for any $\epsilon_2 > 0$ the schedule $S_1$ can be approximated by a schedule $S_2$ whose distribution is a piecewise-constant function that includes at most $s/(\epsilon_1 \epsilon_2)$ segments. This schedule satisfies the staleness constraint, i.e., $EST(S_2) \leq s$, and its maximum waiting time is more than that of $S_1$ by at most $\epsilon_2$, i.e., $EWT(S_2) \leq EWT(S_1) + \epsilon_1 \leq OPT(s)+\epsilon_1+\epsilon_2$. Moreover, a Linear Program that computes $S_2$ can be formulated. The running time of this program is polynomial in $s/(\epsilon_2)$. As a result, for any $\epsilon > 0$ a schedule that satisfies the staleness constraint s and whose maximal waiting time is at most $OPT(s)+\epsilon$ can be computed. Indeed, the above requirement can be satisfied by setting $\epsilon_1=\epsilon_2=(\epsilon)/2$.

1.8 Numerical Results

The optimal and approximation algorithm presented in the previous sections has been used in order to compute the attainable values of worst-case waiting time for a broad range of staleness constraints. The obtained results establish a trade-off between the staleness and waiting time of universal broadcast schedules. The trade-off is depicted on FIG. 4 (series A). This trade-off has a surprising behavior referred to as the "knee" phenomenon: for small values of staleness (typically below 0.3) the minimum waiting time decreases drastically with only a minor increase in the staleness constraint; however, for large values of the staleness constraint (above 0.3), any increase in the staleness constraint results in only a minor decrease of waiting time. A direct result of the knee phenomenon is the existence of a schedule that has small maximum expected waiting time (0.31) and whose worst-case expected staleness is also small (at most 0.3). This point represents a reasonable trade-off between waiting time and staleness. The corresponding schedule reduces the worst-case waiting time by 70% compared to a deterministic schedule while ensuring that the distributed information is up-to-date.

Figure 4:
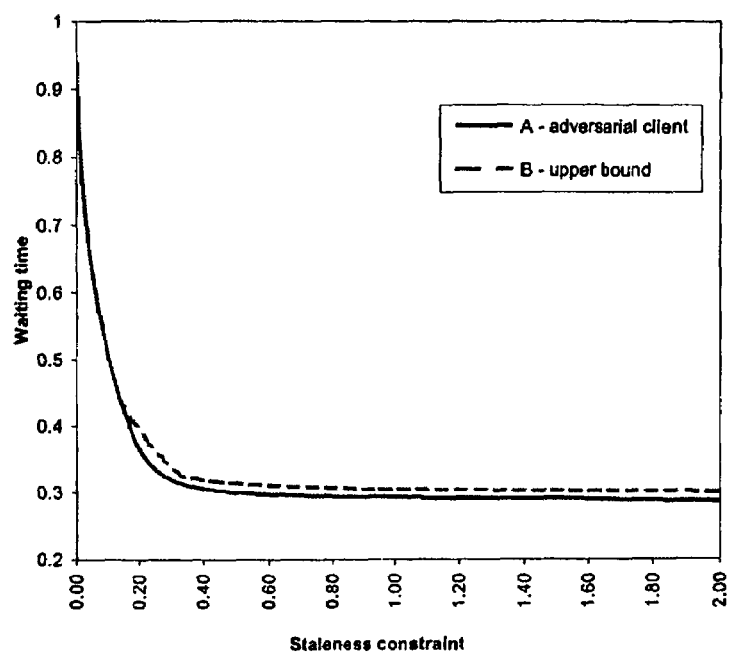
FIG. 4 is a diagram showing staleness/waiting time trade-off of the schedules in accordance with the present disclosure.

The study of analytical (closed form) approximate solutions to the problem at hand gave rise to the following empirical observation. For arbitrary values of s, the distribution function $$G_s(x) = 1 - \Gamma(s + a(s))\left(\frac{s^{x+1-s-a(s)}}{\Gamma(x+1)}\right)$$

yields worst-case waiting time which is very close to optimum. Here a(s) is a constant between 0 and 1, and $\Gamma(x)$ represents the standard Gamma function. The staleness/waiting time trade-off of the schedules defined by $G_s(x)$ are depicted in FIG. 4 (series B).

2. Broadband Schedules with No Encoding

Now, broadcast schedules that use random time intervals and do not employ encoding are detailed. Again, for clarity, it is assumed that the length of each packet is exactly one time unit. In the proposed schedule, each packet is transmitted over a time interval whose length is at least one time unit. In the first portion of the interval no data is being transmitted, and the packet is transmitted in the second portion of the interval. The random interval is defined by specifying, for each packet i, the amount of time that passes between the end of the transmission of packet i−1 and the beginning of the transmission of packet i (for simplicity, it is assumed that the transmission of packet 0 ends at time 0). This time is referred to as the interleaving time.

For a real random variable X, $F_X(t)=Pr[X<t]$ denotes the distribution function of X and $\mu_x=\int_0^\infty (1-F_X(x))dx$ denotes the expected value of X.

This section uses a slightly different definitions of Schedule, Waiting Time and history of the schedule the than those presented in Section 1.

Definition 5 [Schedule S] A schedule is a sequence of random variables $\{X_1, X_2, \ldots\}$ such that $X_i$ is the interleaving time for packet i.

A schedule $S=\{X_1, X_2, \ldots\}$ can also be defined by its transmission sequence $\{T_1, T_2, \ldots\}$, where $T_n$ represents the time in which packet n was transmitted. Namely, $T_n=\sum_{i=1}^n X_i + n-1$ for all $n \geq 1$.

Let S be a schedule, and suppose that a client request is placed at time t. The client's waiting time is defined as the time between t and beginning of the next packet.

Definition 6 [Waiting Time, WT(S,t)] The Waiting Time for a request at time t using a schedule S is defined to be $WT(S,t)=T_n-t$, where n is the first packet for which it holds that $t_n \geq t$. Waiting time WT(S,t) is a random variable. The expectation of WT(S,t) is denoted by $EWT(S,t)=E[WT(S,t)]$.

A random schedule in which the variables $X_i$ are i.i.d. is related to so called renewal processes (e.g., [12], Chapter XIII). Moreover, in this context, $T_n-t$ is well studied. Nevertheless, the questions of interest regarding the expected worst-case value of WT(S,t) for general schedules have not been addressed in the literature.

2.1 Adaptive Adversary

In order to capture the worst-case performance of the schedule, the notion of an adversary is used. This notion has being introduced in paragraph [0023]. In what follows, terms client and adversary are used interchangeably.

In this paragraph a few definitions are introduced. A realization R of a random schedule $S=\{X_1, X_2, \ldots\}$ is a deterministic schedule $\{x_1, x_2, \ldots\}$ that is in the domain of S. Now, the notion of a history of S observed at time t is defined. Let $V_t(x_1, \ldots, x_l)$ be the event in which: (a) $\forall n \leq l\; X_n=x_n$, $$(b) \sum_{i=1}^{l} X_i + l - 1 \leq t, \text{ and } (c) \sum_{i=1}^{l+1} X_i + l > t.$$

That is, the event in which (a) for $n \leq l$, the random variables $X_n$ are equal to $x_n$, (b) the number of (partial) packets broadcasted until time t is at least l, and (c) the l+1'th package has not been transmitted up to time t. Such an event is referred to as a history of S at time t. Namely, any realization $R \in V_t(x_1, \ldots, x_l)$ is completely described up to time t by the interleaving times $\{x_1, \ldots, x_l\}$. Let V(S,t) be the set of possible histories of S at time t. Finally, for any $V \in V(S,t)$ let S|V be the schedule distribution obtained by conditioning S on the event V.

The goal is to design schedules that perform well with any behavior of incoming requests independently of what the viewed history of the channel was before the requests. In particular, the case in which the adversary is adaptive, i.e., its behavior on time t depends on the history of the schedule up to time t is considered. The adversaries might have different degrees of adaptivity. The degree of adaptivity measures the ability of the adversary to generate request based on the history of the schedule. A lower degree of adaptivity corresponds to a more powerful adversary.

Definition 7 [Degree of adaptivity, ω] An adversary is said to be ω-adaptive if its actions at time t are based on a history $V \in V(S,t-\omega)$.

The worst case expected waiting time of the schedule S on ω-adaptive adversaries, W(S,ω), is now defined as:

$$\max\left(\max_{0 \leq t \leq \omega} EWT(S, t), \max_{t \geq \omega} \max_{V \in \vartheta(S,t-\omega)} E[WT(S|V, t)]\right)$$

Namely, W(S,ω) bounds the waiting time of a client no matter at what time t its request is placed or what the history of the schedule was at time t−ω. The first expression above addresses the case in which the client placed a request at time t<ω. This implies that the adversary has not based his request on prior knowledge of the schedule.

2.2 Universal Scheduling for ω=1

In the following section, the design of scheduling strategies in the case in which our adversaries are ω-adaptive for ω=1 is considered. A schedule S for which W(S,1) is strictly less than 1 is presented. Namely, the schedule has $$W(S, 1) = \frac{1}{\sqrt{2}}.$$

The presented schedule is of a simple nature as the random variables $X_1, X_2, \ldots$ that define it are independent and identically distributed (i.e., i.i.d.). This schedule is optimal. That is every other schedule $S'=\{X'_1, X'_2, \ldots\}$ has a corresponding waiting time W(S',1) of value at least $$\frac{1}{\sqrt{2}}.$$

Finally, it is shown that that the transmission rate of the optimal schedule is $$r = \frac{2}{1+\sqrt{2}} \approx 0.82.$$

For larger values of r, a scheduling strategy is presented that has rate r, and worst case expected waiting time which is bounded by $$\frac{2-r-\sqrt{2-2r}}{r}$$

time units. The schedule is defined by i.i.d. random variables, and is the best possible under such a construction.

2.3 Optimal Schedule

In this section a schedule S that has an expected waiting time (i.e., W(S,1)) which is bounded by $$\frac{1}{\sqrt{2}}$$

is presented. The schedule is defined by a single random variable X. That is, S is defined to be $\{X_1, X_2, \ldots\}$, where each random variable $X_i$ is independent and equals X.

The random variable X has a simple structure, and is defined as follows. Let $\mu > 0$ be a parameter that will be fixed in a later stage of our discussion. Let Z be a "random" variable which obtains the value 0 with probability 1. Let U[0,s] be the uniform distribution on the interval [0,s]. Finally let $$p = 1 - \sqrt{\frac{2\mu}{\mu+1}} \, p,$$

and $$s = \sqrt{2\mu(\mu+1)}.$$

In the schedule $S=\{X_1, X_2, \ldots\}$ each random variable $X_i$ is independent and identically distributed. Namely, $X_i=X$ for all i where X=pZ+(1−)U[0,s]. It is not hard to verify that $E[X]=\mu$, and that the support of X is [0,s].

Theorem 2 For any $$\mu \in \left[0, \frac{\sqrt{2}-1}{2}\right]$$

the worst case expected waiting time of S is W(S,1)=1+2μ−$\sqrt{2\mu(\mu+1)}$. Specifically, setting $$\mu = \frac{\sqrt{2}-1}{2}$$

it can be obtained $$W(S, 1) = \frac{1}{\sqrt{2}}.$$

The following theorem shows that the presented schedules are optimal.

Theorem 3 Let $S=\{X_1, X_2, \ldots\}$ be a schedule in which each random variable $X_n$ may be arbitrarily distributed and may depend on $X_i$ for i<n. Then $$W(S, 1) \geq \frac{1}{\sqrt{2}}.$$

2.4 Optimal Schedules for High Rates

In some practical settings the transmission rate, i.e., the average number of packets sent over a period of time, is important. Indeed, along with clients that listen to the channel from time to time, there might be clients that monitor the information all the time. Such clients prefer schedules with high transmission rates, which allow them to receive as many updates as possible. For universal schedules there exists a tradeoff between the transmission rate and minimum worst case waiting time.

The transmission rate of a schedule $S=\{X_1, X_2, \ldots\}$ is defined to be the expected amount of time in which the channel is in use.

Definition 8 [Transmission rate] Let $R_t$ be the expected number of packets sent in $S=\{X_1, X_2, \ldots\}$ up to time t. The transmission rate r of S is defined to be $$\lim_{t \to \infty} \frac{R_t}{t}.$$

In this section, schedules S which are defined by a series of i.i.d. random variables X are considered. For such schedules it can be shown (e.g., [12], Chapter XIII) that the transmission rate of S is $$\frac{1}{1+\mu}$$

where μ is the expectation of X. Schedules of given rate r that have optimized waiting time (with respect to the universal objective) are presented.

The optimal schedule presented in Theorem 2 has rate $$r = \frac{2}{1+\sqrt{2}}.$$

Figure 5:
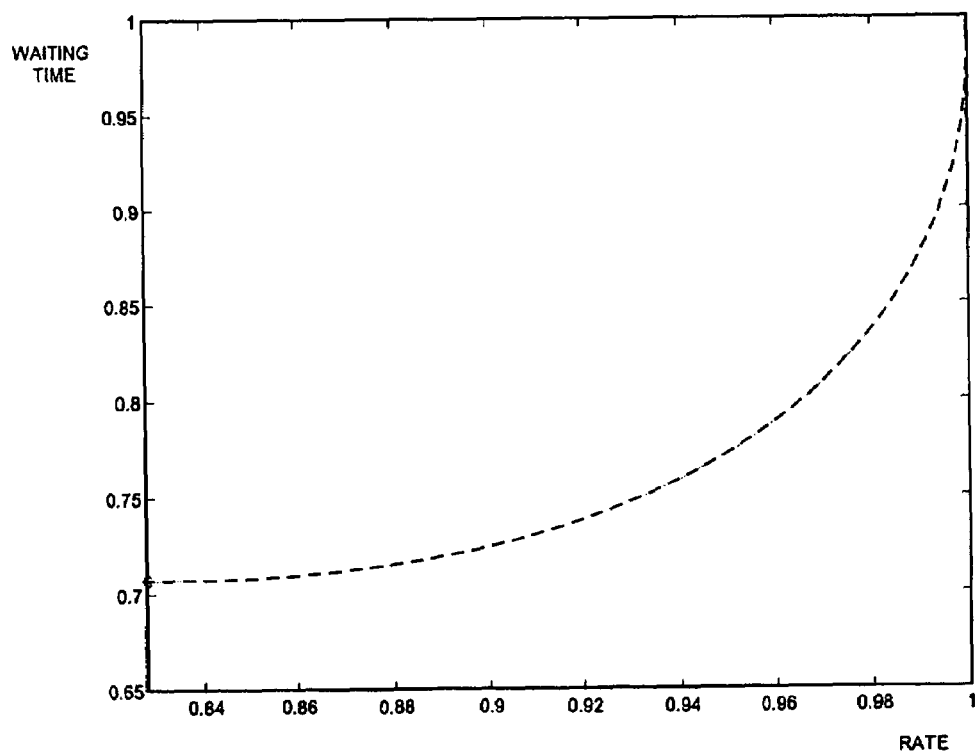
FIG. 5 shows the tradeoff between the transmission rate and worst-case expected waiting time.

Now, a schedule of rate r with expected waiting time of no more than $$\frac{2-r-\sqrt{2-2r}}{r}$$

time units is presented. The schedule is defined by i.i.d. random variables, and is the best possible under such a construction. The tradeoff between the transmission rate of our schedules and the worst case waiting time is depicted in FIG. 5.

Theorem 4 For any $$r \in \left[\frac{2}{1+\sqrt{2}}, 1\right]$$

there exists a schedule $S=\{X_1, X_2, \ldots\}$ with rate r and worst case expected waiting time of $$W(S, 1) = \frac{2-r-\sqrt{2-2r}}{r}.$$

Moreover, any schedule $S'=\{X'_1, X'_2, \ldots\}$ in which $X'_n$ are i.i.d with rate r satisfies $W(S',1) \geq W(S,1)$.

While several illustrative embodiments of the invention have been shown and described in the above description, numerous variations and alternative embodiments will occur to those skilled in the art. Such variations and alternative embodiments are contemplated, and can be made without departing from the scope of the invention as defined in the appended claims.

REFERENCES

[1] S. Acharya, R. Alonso, M. Franklin, and S. Zdonik. Broadcast Disks: Data Management for Asymmetric Communication Environments. In *Proceedings of ACM SIGMOD*, pages 199-210, San Jose, Calif., May 1995.

[2] M. H. Ammar and J. W. Wong. The Design of Teletext Broadcast Cycles. *Performance Evaluation*, 5(4):235-242, 1985.

[3] M. H. Ammar. Response Time in a Teletext System: An Individual User's Perspective. *IEEE Trans. Comm.*, COM-35(11):1159-1170, 1987.

[4] A. Bar-Noy, J. Naor, and B. Schieber. Pushing Dependent Data in Clients-Providers-Servers Systems. *Wireless Networks*, 9(5):421-430, 2003.

[5] A. Borodin and R. El-Yaniv. *Online Computation and Competitive Analysis*, Chapter 7, Cambridge University Press, 1998.

[6] Z. Brakerski, A. Nisgav, and B. Patt-Shamir. General Perfectly Periodic Scheduling. In *Proceedings of PODC '02*, pages 163-172, June 2002.

[7] D. Cheriton. Dissemination-Oriented Communication Systems. Technical report, Stanford University, 1992.

[8] K. Foltz, L. Xu, and J. Bruck. Scheduling for Efficient Data Broadcast over Two Channels. In *Proceedings of International Symposium on Information Theory (ISIT)*, page 113, Chicago, Ill., USA, June 2004.

[9] S. Hameed and N. H. Vaidya. Log-time Algorithms for Scheduling Single and Multiple Channel Data Broadcast. In *Proceedings of MOBICOM'97*, 1997.

[10] T. Imielinski, S. Viswanathan, and B. R. Badrinath. Data on Air: Organization and Access. *IEEE Transactions on Knowledge and Data Engineering*, 9(3):353-372, 1997.

[11] N. H. Vaidya and S. Hameed. Data Broadcast in Asymmetric Wireless Environments. In *Proceedings of First International Workshop on Satellite-based Information Services (WOSBIS)*, 1996.

[12] W. Feller. *An Introduction to Probability Theory and Its Applicatitons*. John Wiley & Sons, Inc., 1966.

What is claimed is:

1. A data transmission system comprising:
   a database;
   a server, connected with the database, to schedule information to be transmitted;
   a broadcast channel; and
   a plurality of clients to receive said information transmitted from the server through the broadcast channel, wherein said information is transmitted to the clients over time intervals of random length.

2. The system of claim 1, wherein each time interval comprises a portion during which no data is being transmitted.

3. The system of claim 1, wherein said information is transmitted in an encoded form, said encoded form having an encoding length matching said random length.

4. A method of transmitting data over a channel, comprising:
   sending the data as packets; and
   allocating a randomly selected time interval length to each packet, wherein the packets are encoded, the encoded packets having an encoding length matching said time interval length, and wherein time interval length is randomly selected and wherein a sequence of time interval lengths is generated to optimize waiting times of the clients and the staleness of information.

5. A method of transmitting data over a channel, comprising:
   sending the data as packets; and
   allocating a randomly selected time interval length to each packet, wherein the packets are encoded, the encoded packets having an encoding length matching said time interval length, and wherein time interval length is randomly selected and wherein a sequence of time interval lengths is generated to optimize a worst case expected waiting time subject to a staleness constraint.

6. A method of transmitting data over a channel, comprising:
   sending the data as packets; and
   allocating a randomly selected time interval length to each packet, wherein the packets are encoded, the encoded packets having an encoding length matching said time interval length, and wherein time interval length is randomly selected and uniformly distributed on an interval.

7. A method of transmitting data over a channel, comprising:
   sending the data as packets; and
   allocating a randomly selected time interval length to each packet, wherein the packets are encoded, the encoded packets having an encoding length matching said time interval length, and wherein time interval lengths for different packets are randomly selected in an independently therebetween and identically distributed manner to optimize a worst case expected waiting time subject to a staleness constraint.

8. A method of transmitting data over a channel, comprising:
sending the data as packets; and
allocating a randomly selected time interval length to each packet, wherein each time interval comprises a first portion during which no data is transmitted and a second portion containing the packet, and wherein said time interval length is randomly selected and wherein a sequence of time interval lengths is generated to optimize waiting times of clients and transmission rate.

9. A method of transmitting data over a channel, comprising:
sending the data as packets; and
allocating a randomly selected time interval length to each packet, wherein each time interval comprises a first portion during which no data is transmitted and a second portion containing the packet, and wherein said time interval length is randomly selected and wherein a sequence of time interval lengths is generated to perform for clients with various degrees of adaptivity.

10. A method of transmitting data over a channel, comprising:
sending the data as packets; and
allocating a randomly selected time interval length to each packet, wherein each time interval comprises a first portion during which no data is transmitted and a second portion containing the packet, and wherein said time interval length is randomly selected in an independently and identically distributed manner to optimize a worst case expected waiting time and transmission rate.

11. A method of transmitting data over a channel, comprising:
sending the data as packets; and
allocating a randomly selected time interval length to each packet, wherein each time interval comprises a first portion during which no data is transmitted and a second portion containing the packet, and wherein said time interval length is randomly selected and wherein a sequence of time interval lengths is generated to optimize a worst case expected waiting time subject to a transmission rate constraint.

12. A method for generating a transmission schedule of data packets over a broadcast channel from a server, comprising:
providing a staleness constraint;
providing an approximation parameter; and
the server computing and using a transmission schedule of encoded data packets at randomly selected time interval lengths based on said staleness constraint and said approximation parameter.

13. The method of claim 12, wherein said transmission schedule has a worst case expected waiting time within said approximation parameter and wherein staleness is at most said staleness constraint.

14. A system for constructing a broadcast schedule, comprising:
a plurality of packets to be transmitted periodically over time intervals to incorporate requests arriving at different times;
a random bit generator; and
a packet encoder to encode the packets to be transmitted, wherein said time intervals are random time intervals based on said random bit generator.

* * * * *

UNITED STATES PATENT AND TRADEMARK OFFICE
CERTIFICATE OF CORRECTION

PATENT NO. : 7,680,147 B2
APPLICATION NO. : 11/218334
DATED : March 16, 2010
INVENTOR(S) : Jehoshua Bruck et al.

It is certified that error appears in the above-identified patent and that said Letters Patent is hereby corrected as shown below:

Under "STATEMENT OF FEDERAL INTEREST" in the specification, the sentence "The invention described herein was made in the performance of work under a NASA contract, and is subject to the provisions of Public Law 96-517 (35 USC 202) in which the Contractor has elected to retain title." is incorrect and should be removed. In its place, the sentence "The U.S. Government has certain rights in this invention pursuant to Grant No. ANI-0322475 awarded by the National Science Foundation." should appear.

Signed and Sealed this

Seventh Day of December, 2010

David J. Kappos
*Director of the United States Patent and Trademark Office*